United States Patent
Yu et al.

(10) Patent No.: US 11,029,474 B2
(45) Date of Patent: Jun. 8, 2021

(54) FIBER ACCESS TERMINAL

(71) Applicant: HUAWEI TECHNOLOGIES CO., LTD., Shenzhen (CN)

(72) Inventors: Jianxiong Yu, Wuhan (CN); Wei Xiong, Dongguan (CN); Wenxin Wu, Shenzhen (CN); Tao Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/553,191

(22) Filed: Aug. 28, 2019

(65) Prior Publication Data

US 2019/0384016 A1 Dec. 19, 2019

Related U.S. Application Data

(63) Continuation of application No. PCT/CN2017/075182, filed on Feb. 28, 2017.

(51) Int. Cl.
*G02B 6/38* (2006.01)
*G02B 6/44* (2006.01)

(52) U.S. Cl.
CPC ......... *G02B 6/3897* (2013.01); *G02B 6/4446* (2013.01); *G02B 6/4471* (2013.01)

(58) Field of Classification Search
None
See application file for complete search history.

(56) References Cited

U.S. PATENT DOCUMENTS

| 6,874,945 B2* | 4/2005 | Gherardini | G02B 6/3821 385/139 |
| 6,963,690 B1* | 11/2005 | Kassal | G02B 6/3817 385/137 |

(Continued)

FOREIGN PATENT DOCUMENTS

| CN | 201285461 Y | 8/2009 |
| CN | 101669057 A | 3/2010 |

(Continued)

OTHER PUBLICATIONS

Japanese Office Action issued in corresponding Japanese Application No. 2019-546926, dated Sep. 7, 2020, pp. 1-5, Japan Patent Office, Tokyo, Japan.

(Continued)

*Primary Examiner* — Tina M Wong
(74) *Attorney, Agent, or Firm* — Hauptman Ham, LLP

(57) ABSTRACT

A fiber access terminal including a first assembly and a second assembly. The first assembly includes a first box body and an optical fiber adapter. The second assembly includes a second box body, an optical splitter, an optical fiber connector, and a plurality of optical fiber adapters. The optical fiber adapter of the first assembly is disposed outside the first box body. The optical splitter is disposed inside the second box body, and the optical fiber connector and the plurality of optical fiber adapters of the second assembly are disposed outside the second box body. A first end of the optical fiber connector is detachably connected to the optical fiber adapter of the first assembly, a second end of the optical fiber connector is connected to an input port of the optical splitter, and each output port is connected to one optical fiber adapter of the second assembly.

9 Claims, 5 Drawing Sheets

(56) References Cited

U.S. PATENT DOCUMENTS

| | | | | |
|---|---|---|---|---|
| 7,239,789 B2* | 7/2007 | Grubish | ............... | G02B 6/4442 |
| | | | | 385/135 |
| 7,270,485 B1* | 9/2007 | Robinson | ............ | G02B 6/4471 |
| | | | | 385/136 |
| 7,287,913 B2* | 10/2007 | Keenum | ............. | G02B 6/3897 |
| | | | | 385/135 |
| 7,313,311 B1* | 12/2007 | Benbow | ............... | G02B 6/4451 |
| | | | | 385/134 |
| 8,672,560 B2* | 3/2014 | Haley | .................... | G02B 6/383 |
| | | | | 385/60 |
| 9,279,951 B2* | 3/2016 | McGranahan | ....... | G02B 6/4453 |
| 10,725,246 B1* | 7/2020 | Liu | ..................... | G02B 6/3825 |
| 2002/0037139 A1* | 3/2002 | Asao | ..................... | G02B 6/387 |
| | | | | 385/78 |
| 2006/0165366 A1* | 7/2006 | Feustel | ................ | G02B 6/2804 |
| | | | | 385/135 |
| 2013/0022328 A1 | 1/2013 | Gronvall et al. | | |
| 2013/0209051 A1 | 8/2013 | Wu et al. | | |
| 2015/0260924 A1 | 9/2015 | Huang et al. | | |
| 2015/0355428 A1 | 12/2015 | Leeman et al. | | |

FOREIGN PATENT DOCUMENTS

| | | |
|---|---|---|
| CN | 102012548 A | 4/2011 |
| CN | 102323649 A | 1/2012 |
| CN | 203287588 U | 11/2013 |
| CN | 103926667 A | 7/2014 |
| CN | 205750047 U | 11/2016 |
| JP | S6093333 U | 6/1985 |
| JP | 2005308851 A | 11/2005 |
| JP | 2009015022 A | 1/2009 |
| JP | 2009182666 A | 8/2009 |
| JP | 2009258178 A | 11/2009 |
| JP | 2011248099 A | 12/2011 |
| JP | 2012185366 A | 9/2012 |
| KR | 20150046603 A | 4/2015 |
| RU | 2554300 C2 | 6/2015 |
| WO | 2015193384 A2 | 12/2015 |
| WO | 2016128083 A1 | 8/2016 |

OTHER PUBLICATIONS

Korean Office Action issued in corresponding Korean Application No. 10-2019-7026825, dated Feb. 15, 2021, pp. 1-5, Korean Intellectual Property Office, Daejeon, Republic of Korea.

* cited by examiner

FIBER ACCESS TERMINAL

CROSS-REFERENCE TO RELATED APPLICATIONS

This application is a continuation of International Application No. PCT/CN2017/075182, filed on Feb. 28, 2017, the disclosure of which is hereby incorporated by reference in its entirety.

TECHNICAL FIELD

The present invention relates to the field of optical fiber technologies, and in particular, to a fiber access terminal.

BACKGROUND

With development of optical fiber technologies, application of optical cables in communication is popularized. For example, a growing quantity of users use fiber broadband to access the Internet. A user may guide an optical fiber indoors through a fiber access terminal (Fiber Access Terminal, FAT).

Specifically, a FAT includes components such as a box body and an optical fiber adapter. The box body is provided with an optical cable inlet and an optical cable outlet (where an optical cable usually includes a plurality of optical fibers). One optical fiber of an optical cable in the optical cable inlet may be connected to one end of the optical fiber adapter by using an optical fiber connector (when the FAT has a plurality of optical fiber adapters, one end of each optical fiber adapter may be connected to one optical fiber of the optical cable in the optical cable inlet). The other end of the optical fiber adapter may be connected to an optical fiber connected to the optical fiber connector (the optical fiber may be referred to as a drop fiber), and the optical cable including remaining another optical fiber may be guided out from the optical cable outlet. The optical fiber adapter and the optical fiber connector implement a function of connecting two optical fibers. When the user intends to subscribe to fiber broadband, the optical fiber connected to the optical fiber connector may be connected to the other end of the optical fiber adapter by using the optical fiber connector, to guide the optical fiber indoors. Currently, a quantity of optical fiber adapters included in a FAT is fixed. To be specific, a quantity of households to which the FAT can guide an optical fiber is fixed. A staff member may select a FAT with an appropriate quantity of optical fiber adapters based on a quantity of households currently subscribing to fiber broadband, and dispose the FAT inside a corridor or at another position.

In a process of implementing the present invention, the inventor found that at least the following problem exists in the prior art:

After the FAT is disposed based on the current quantity of households, when another user subscribes to fiber broadband, because the optical fiber adapters in the originally disposed FAT are insufficient, the staff member usually needs to remove the originally disposed FAT, and re-dispose a FAT with a quantity of optical fiber adapters matching the current quantity of households. The operation is relatively cumbersome. Consequently, operation efficiency is relatively low.

SUMMARY

To improve operation efficiency, embodiments of the present invention provide a fiber access terminal. A technical solution is as follows:

A fiber access terminal is provided. The fiber access terminal may include a first assembly and a second assembly. The first assembly may include a first box body and an optical fiber adapter. The second assembly may include a second box body, an optical splitter, an optical fiber connector, and a plurality of optical fiber adapters. The optical fiber adapter of the first assembly may be disposed outside the first box body, and the first box body may be provided with an optical cable inlet and an optical cable outlet. The optical splitter may be disposed inside the second box body, and the optical fiber connector and the plurality of optical fiber adapters of the second assembly are disposed outside the second box body. A first end of the optical fiber connector is detachably connected to the optical fiber adapter of the first assembly, a second end of the optical fiber connector is connected to an input port of the optical splitter, and each output port of the optical splitter is connected to one optical fiber adapter of the second assembly.

In the solution shown in the embodiments of the present invention, the fiber access terminal may include two assemblies (to be specific, the first assembly and the second assembly). The first box body of the first assembly may be provided with the optical cable inlet and the optical cable outlet. The second assembly may be detachably connected to the first assembly. In this way, after the fiber access terminal is disposed based on a current quantity of households, when another user subscribes to fiber broadband, a staff member may replace the second assembly of the previously disposed fiber access terminal with a second assembly including more optical fiber adapters, and the staff member does not need to remove the first assembly, so that operation efficiency can be improved.

In an implementation, the second assembly further includes a plurality of dustproof caps, and each of the plurality of dustproof caps is disposed on one optical fiber adapter of the second assembly.

In this way, when the optical fiber adapter is not used, the optical fiber adapter can be protected against pollution.

In an implementation, the first box body is provided with a guide groove, the second box body is provided with a protrusion, and the guide groove is engaged with the protrusion.

In this way, when the staff member connects the first assembly to the second assembly, a connection between the optical fiber adapter and the optical fiber connector can be implemented more precisely and rapidly.

In an implementation, the first assembly further includes a first fastening component, and the first box body includes an upper box body and a lower box body. The upper box body and the lower box body may be fastened by using the first fastening component.

In a possible implementation, the first fastening component includes a plurality of screws, and the upper box body and the lower box body are fastened by using the plurality of screws.

In an implementation, the fiber access terminal further includes a second fastening component. The first assembly and the second assembly are fastened by using the second fastening component.

In an implementation, the second fastening component includes a plurality of screws. The first assembly and the second assembly are fastened by using the plurality of screws.

In an implementation, there are one or more optical fiber adapters of the first assembly. A quantity of optical fiber connectors and that of optical splitters are consistent with a quantity of optical fiber adapters of the first assembly. A first end of each optical fiber connector is detachably connected to one optical fiber adapter of the first assembly, and a second end of each optical fiber connector is connected to an input port of one optical splitter.

In an implementation, the optical fiber adapter of the first assembly and the plurality of optical fiber adapters of the second assembly are outdoor optical fiber adapters.

In an implementation, the optical fiber adapter of the first assembly is disposed at the bottom of the first box body, the optical fiber connector is disposed at the top of the second box body, and the plurality of optical fiber adapters of the second assembly are disposed at the bottom of the second box body.

In this way, after being put into use, the fiber access terminal can be better waterproof, so that a service time of the fiber access terminal can be prolonged.

Beneficial effects of the technical solution provided in the embodiments of the present invention are:

In various embodiments, the fiber access terminal may include the first assembly and the second assembly. The first assembly may include the first box body and the optical fiber adapter. The second assembly may include the second box body, the optical splitter, the optical fiber connector, and the plurality of optical fiber adapters. The optical fiber adapter of the first assembly may be disposed outside the first box body, and the first box body may be provided with the optical cable inlet and the optical cable outlet. The optical splitter may be disposed inside the second box body, and the optical fiber connector and the plurality of optical fiber adapters of the second assembly are disposed outside the second box body. The first end of the optical fiber connector is detachably connected to the optical fiber adapter of the first assembly, the second end of the optical fiber connector is connected to the input port of the optical splitter, and each output port of the optical splitter is connected to one optical fiber adapter of the second assembly. In this way, after the fiber access terminal is disposed based on the current quantity of households, when another user subscribes to fiber broadband, the staff member may replace the second assembly of the previously disposed fiber access terminal with the second assembly including more optical fiber adapters, and the staff member does not need to remove the first assembly, so that operation efficiency can be improved.

REFERENCE NUMERALS

| | |
|---|---|
| 1. First assembly | 11. First box body |
| 111. Optical cable inlet | 112. Optical cable outlet |
| 113. Guide groove | 114. Upper box body |
| 115. Lower box body | 12. Optical fiber adapter of the first assembly |
| 13. First fastening component | 131. Screw of the first fastening component |
| 2. Second assembly | 21. Second box body |
| 211. Protrusion | 22. Optical splitter |
| 23. Optical fiber connector | 24. Optical fiber adapter of the second assembly |
| 25. Dustproof cap | 3. Second fastening component |
| 31. Screw of the second fastening component | |

DESCRIPTION OF EMBODIMENTS

Figure 1:
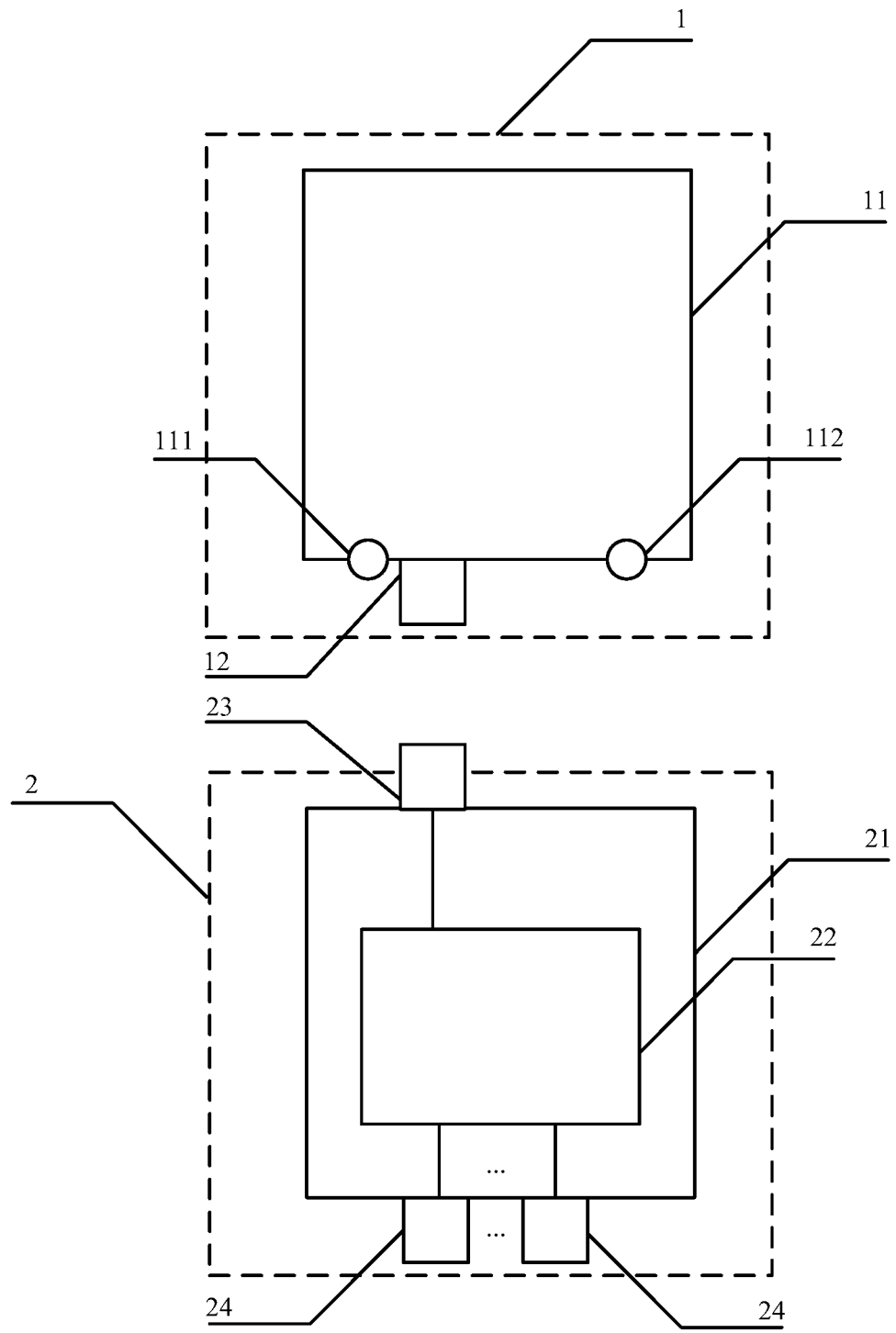
FIG. 1 is a schematic structural diagram of a fiber access terminal according to an embodiment of the present invention.

FIG. 1 shows a fiber access terminal according to an embodiment of the present invention. Referring to FIG. 1, the fiber access terminal includes a first assembly 1 and a second assembly 2. The first assembly 1 includes a first box body 11 and an optical fiber adapter 12. The second assembly 2 includes a second box body 21, an optical splitter 22, an optical fiber connector 23, and a plurality of optical fiber adapters 24. The optical fiber adapter 12 of the first assembly 1 is disposed outside the first box body 11, and the first box body 11 is provided with an optical cable inlet 111 and an optical cable outlet 112. The optical splitter 22 is disposed inside the second box body 21, and the optical fiber connector 23 and the plurality of optical fiber adapters 24 of the second assembly 2 are disposed outside the second box body 21. A first end of the optical fiber connector 23 is detachably connected to the optical fiber adapter 12 of the first assembly 1, a second end of the optical fiber connector 23 is connected to an input port of the optical splitter 22, and each output port of the optical splitter 22 is connected to one optical fiber adapter 24 of the second assembly 2.

In implementation, the fiber access terminal may include the first assembly 1 and the second assembly 2. The first assembly 1 may operate independently, or may operate in combination with the second assembly 2. The first assembly 1 may include the first box body 11 and the optical fiber adapter 12, where the optical fiber adapter 12 may be disposed outside the first box body 11. The first box body 11 may be further provided with the optical cable inlet 111 and the optical cable outlet 112. When the first assembly 1 is put into use, an optical cable may enter the first box body 11 through the optical cable inlet 111, and may be guided out from the first box body 11 through the optical cable outlet 112. A material of the first box body 11 may be plastic.

The first assembly 1 may further include an optical fiber splicing component and a pigtail that has a pre-fabricated optical fiber connector. The optical fiber splicing component may implement a function of storing the optical cable and protecting an optical fiber. The optical fiber splicing component and the pigtail that has the pre-fabricated optical fiber connector are disposed inside the first box body 11, and the other end of the pigtail is connected to one end of the optical fiber adapter 12 by using the pre-fabricated optical fiber connector. When the first assembly 1 is put into use, a staff member may splice one optical fiber in the optical cable entering the optical cable inlet 111 with the pigtail. When a user intends to subscribe to fiber broadband, an optical fiber having a pre-fabricated optical fiber connector (the optical fiber may be referred to as a drop fiber) may be connected to the other end of the optical fiber adapter 12 by using the optical fiber connector, to be guided indoors. In other words, when the first assembly 1 is put into use, one end of the optical fiber adapter 12 may be connected to the pre-fabricated optical fiber connector, of the pigtail, disposed inside the first box body 11, and the other end may be connected to the drop fiber by using the optical fiber connector.

Figure 2:
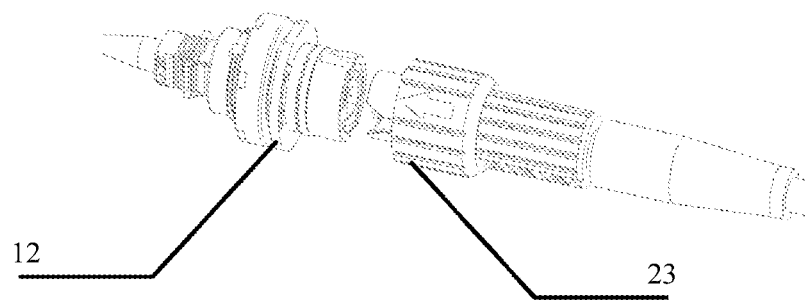
FIG. 2 is a schematic diagram of a optical fiber adapter and an optical fiber connector according to an embodiment of the present invention.

The second assembly 2 may include the second box body 21, the optical splitter 22, the optical fiber connector 23, and the plurality of optical fiber adapters 24. The optical splitter 22 may be disposed inside the second box body 21. The optical fiber connector 23 and the plurality of optical fiber adapters 24 of the second assembly 2 may be disposed outside the second box body 21. The second end of the optical fiber connector 23 is connected to the input port of the optical splitter 22 (where the second end of the optical fiber connector 23 is connected to the input port of the optical splitter 22 by using an optical fiber). Each output port of the optical splitter 22 is connected to one optical fiber adapter 24 of the second assembly 2 (where each output port of the optical splitter 22 may be connected to an optical fiber having a pre-fabricated optical fiber connector, to be specific, each output port of the optical splitter 22 may be connected to one optical fiber adapter 24 of the second assembly 2 by using an optical fiber connector of the output port). The second assembly 2 may operate in combination with the first assembly 1. When the second assembly 2 operates in combination with the first assembly 1, the first end of the optical fiber connector 23 of the second assembly 2 may be detachably connected to the optical fiber adapter 12 of the first assembly 1. Each optical fiber adapter 24 may be connected to one drop fiber. An example of the optical fiber adapter 12 and the optical fiber connector 23 are shown in FIG. 2. Because the second assembly 2 includes the plurality of optical fiber adapters 24, a capacity of the fiber access terminal may be changed by replacing the second assembly 2 with a second assembly 2 including a different quantity of optical fiber adapters 12 (that is, changing a quantity of optical fiber adapters of the fiber access terminal). In this way, after a FAT is disposed based on the current quantity of households, when another user subscribes to fiber broadband, the staff member may replace the original second assembly with a second assembly including more optical fiber adapters, to increase the quantity of optical fiber adapters of the FAT. The staff member does not need to remove the first assembly and re-dispose a FAT with a quantity of optical fiber adapters matching the current quantity of households, so that operation efficiency can be improved.

Figure 3:
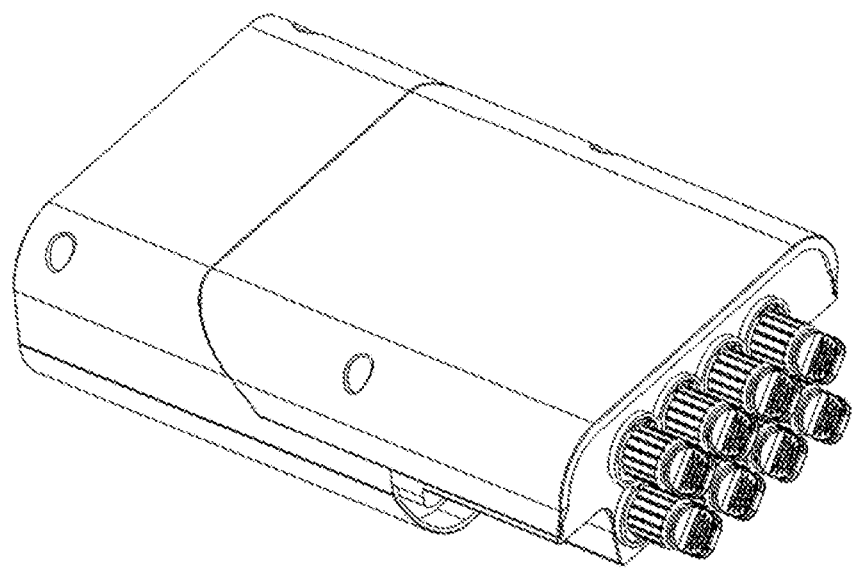
FIG. 3 is a schematic structural diagram of a fiber access terminal according to an embodiment of the present invention.

In addition, the first box body 11 may have a bevel. Correspondingly, the second box body 21 may have a bevel matching the bevel of the first box body 11. The first assembly 1 and the second assembly 2 that are connected together are shown in FIG. 3.

Figure 4:
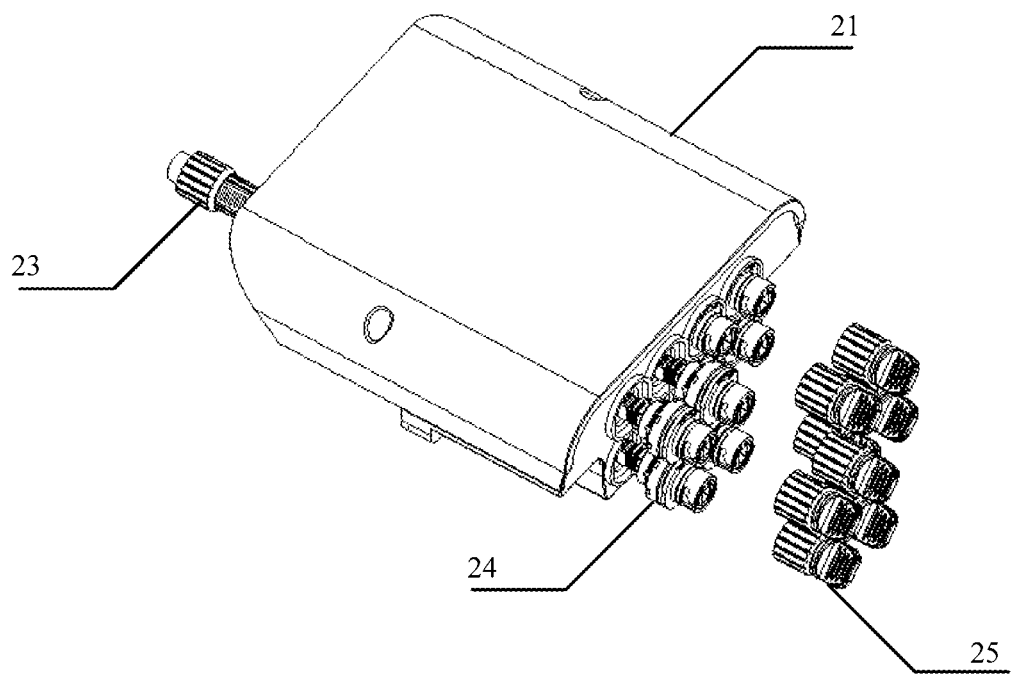
FIG. 4 is a schematic structural diagram of a second assembly according to an embodiment of the present invention.

In some embodiments, the second assembly may further include a plurality of dustproof caps 25. As shown in FIG. 4, a quantity of dustproof caps 25 may be consistent with that of the optical fiber adapters 24. Each of the plurality of dustproof caps 25 may be disposed on one optical fiber adapter 24 of the second assembly 2. In this way, when the optical fiber adapter is not used, the optical fiber adapter can be protected against pollution.

Figure 5:
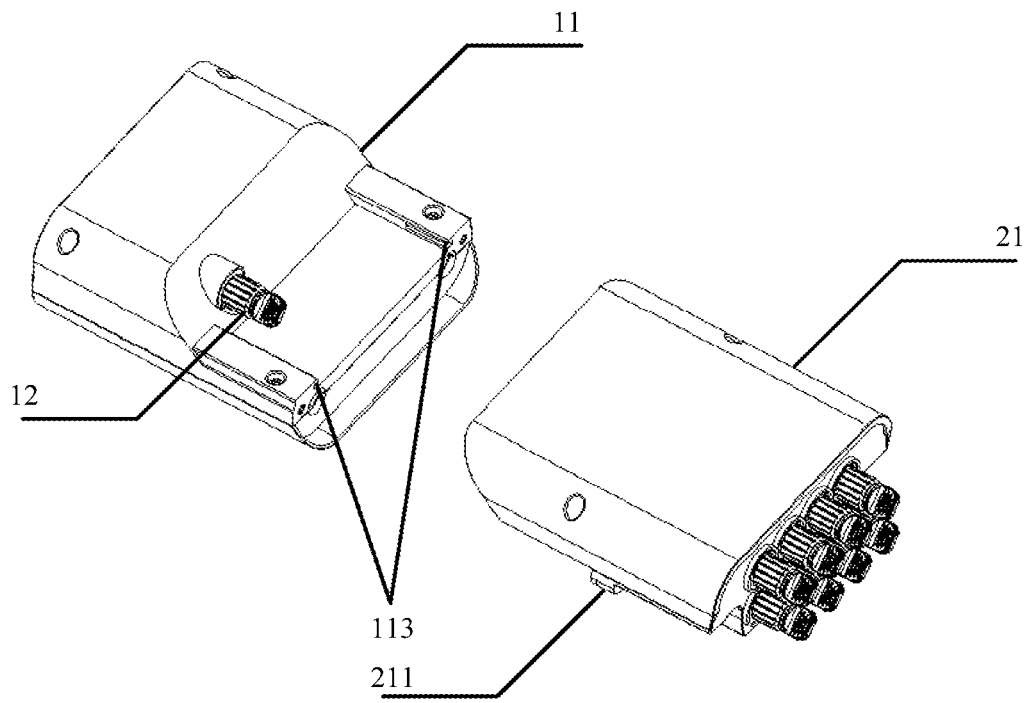
FIG. 5 is a schematic structural diagram of a fiber access terminal according to an embodiment of the present invention.

In some embodiments, as shown in FIG. 5, the first box body 11 may be provided with a guide groove 113, the second box body 21 is provided with a protrusion 211, and the guide groove 113 is engaged with the protrusion 211.

In implementation, to help the staff member connect the optical fiber connector 23 of the second assembly 2 to the optical fiber adapter 12 of the first assembly 1, the first box body 11 may be provided with the guide groove 113, and the second box body 21 is provided with the protrusion.

In this way, the guide groove 113 may be engaged with the protrusion 211, and pre-positioning is performed. This can enable the staff member to more precisely and rapidly connect the optical fiber connector 23 to the optical fiber adapter 12.

In some embodiments, the first assembly 1 further includes a first fastening component 13, and the first box body includes an upper box body 114 and a lower box body 115. The upper box body 114 and the lower box body 115 may be fastened by using the first fastening component 13.

Figure 6:
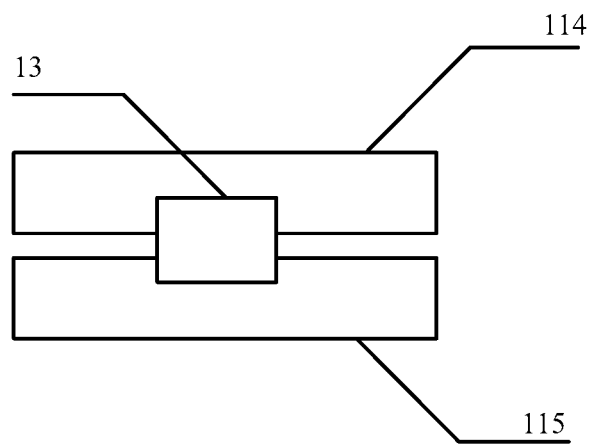
FIG. 6 is a schematic structural diagram of a fiber access terminal according to an embodiment of the present invention.

In implementation, the first box body of the first assembly 1 may be formed by fastening the upper box body 114 and the lower box body 115 with the first fastening component 13, and a side view of the first assembly 1 is shown in FIG. 6.

In some embodiments, the first fastening component 13 may include a plurality of screws 131, and the upper box body 114 and the lower box body 115 may be fastened by using the plurality of screws 131.

Figure 7:
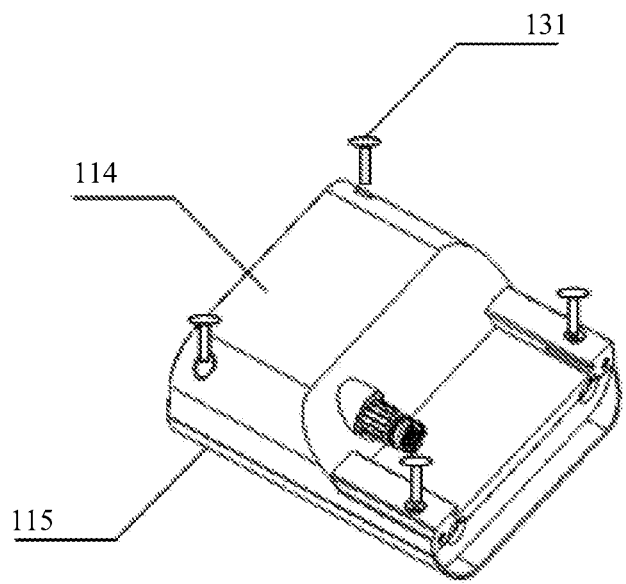
FIG. 7 is a schematic structural diagram of a first assembly according to an embodiment of the present invention.

In implementation, the first fastening component 13 may include the plurality of screws 131, and for example, may include four screws 131. As shown in FIG. 7, the upper box body 114 and the lower box body 115 may each be provided with threads corresponding to the plurality of screws 131. In this way, the upper box body 114 and the lower box body 115 may be fastened by using the screws 131 and the threads corresponding to the screws 131. When the fiber access terminal is put into use, it is convenient for the staff member to open the first box body 11 and then splice one optical fiber in the optical cable with the pigtail. In addition, when the first box body 11 has the bevel and the second box body 21 has the bevel matching the bevel of the first box body 11, through holes may be disposed at positions of the second box body 21 corresponding to two screws located at the bottom of the first box body 11.

In addition, the second box body 21 also includes an upper box body and a lower box body. The upper box body and the lower box body of the second box body 21 may be fastened in a manner the same as the fastening manner of the first box body 11, or may be fastened by ultrasonic welding.

In some embodiments, the fiber access terminal further includes a second fastening component 3, and the first assembly 1 and the second assembly 2 are fastened by using the second fastening component.

Figure 8:
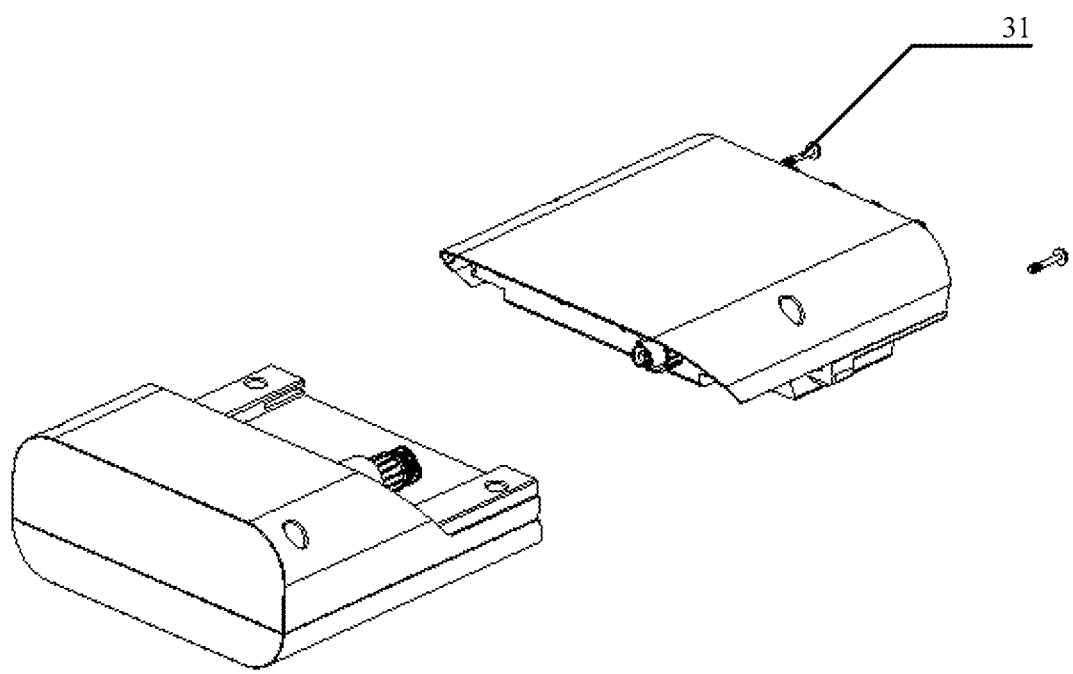
FIG. 8 is a schematic structural diagram of a fiber access terminal according to an embodiment of the present invention.

In some embodiments, as shown in FIG. 8, the second fastening component 3 includes a plurality of screws 31, and the first assembly 1 and the second assembly 2 are fastened by using the plurality of screws 31.

In implementation, the second fastening component may include the plurality of screws 31, and for example, may include two screws. The first box body 11 and the second box body 21 may be provided with threads corresponding to the screws 31. As shown in FIG. 8, the first assembly 1 and the second assembly may be fastened by using the screws and the threads corresponding to the screws 31.

In some embodiments, there are one or more optical fiber adapters 12 of the first assembly 1. A quantity of optical fiber connectors 23 and that of optical splitters 22 are consistent with a quantity of optical fiber adapters 12 of the first assembly 1. A first end of each optical fiber connector 23 is detachably connected to one optical fiber adapter 12 of the first assembly 1, and a second end of each optical fiber connector 23 is connected to an input port of one optical splitter 22.

In implementation, the first assembly 1 may include one optical fiber adapter, or may include a plurality of optical fiber adapters (for example, there may be two optical fiber adapters). Correspondingly, the quantity of optical fiber connectors 23 and that of the optical splitters 22 are consistent with the quantity of optical fiber adapters 12 of the first assembly 1. To be specific, when the first assembly includes one optical fiber adapter, the second assembly may include one optical fiber connector and one optical splitter, and when the first assembly 1 includes a plurality of optical fiber adapters, the second assembly may include a plurality of optical fiber connectors and a plurality of optical splitters. A first end of each optical fiber connector 23 is detachably connected to one optical fiber adapter 12 of the first assembly, and a second end of each optical fiber connector 23 is connected to an input port of one optical splitter 22.

In some embodiments, the optical fiber adapter 12 of the first assembly 1 and the plurality of optical fiber adapters 24 of the second assembly 2 may be outdoor optical fiber adapters.

In some embodiments, the optical fiber adapter 12 of the first assembly 1 may be disposed at the bottom of the first box body 11. The optical fiber connector 23 may be disposed at the top of the second box body 21, and the plurality of optical fiber adapters 24 of the second assembly 2 may be disposed at the bottom of the second box body 21.

In this way, after being put into use, the fiber access terminal can be better waterproof, so that a service time of the fiber access terminal can be prolonged.

In the embodiments of the present invention, the fiber access terminal may include the first assembly and the second assembly. The first assembly may include the first box body and the optical fiber adapter. The second assembly may include the second box body, the optical splitter, the optical fiber connector, and the plurality of optical fiber adapters. The optical fiber adapter of the first assembly may be disposed outside the first box body, and the first box body may be provided with the optical cable inlet and the optical cable outlet. The optical splitter may be disposed inside the second box body, and the optical fiber connector and the plurality of optical fiber adapters of the second assembly are disposed outside the second box body. The first end of the optical fiber connector is detachably connected to the optical fiber adapter of the first assembly, the second end of the optical fiber connector is connected to the input port of the optical splitter, and each output port of the optical splitter is connected to one optical fiber adapter of the second assembly. In this way, after the fiber access terminal is disposed based on the current quantity of households, when another user subscribes to fiber broadband, the staff member may replace the second assembly of the previously disposed fiber access terminal with the second assembly including more optical fiber adapters, and the staff member does not need to remove the first assembly, so that operation efficiency can be improved.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, or an optical disc.

The foregoing descriptions are merely some embodiments of the present invention, and are not intended to be limiting. Any modification, equivalent replacement, or improvement made without departing from the spirit and principle of this disclosure should fall within the protection scope in accordance with this disclosure.

What is claimed is:

1. A fiber access terminal, wherein the fiber access terminal comprises a first assembly and a second assembly, wherein the first assembly comprises a first box body and an optical fiber adapter, and the second assembly comprises a second box body, an optical splitter, an optical fiber connector, and a plurality of optical fiber adapters, wherein
the optical fiber adapter of the first assembly is disposed outside the first box body, the first box body being provided with an optical cable inlet and an optical cable outlet;
the optical splitter is disposed inside the second box body, the optical fiber connector and the plurality of optical fiber adapters of the second assembly being disposed outside the second box body; and
a first end of the optical fiber connector is detachably connected to the optical fiber adapter of the first assembly, a second end of the optical fiber connector is connected to an input port of the optical splitter, and each output port of the optical splitter is connected to one optical fiber adapter of the second assembly;
the optical fiber adapter extends in a first direction;
the optical fiber connector extends in the first direction;
the first box body comprises a guide groove and a first bevel portion;
the second box body comprises a protrusion configured to engage the guide groove and a second bevel portion;
the first bevel portion and the second bevel portion overlap in a second direction perpendicular to the first direction when the protrusion is engaged with the guide groove; and
the first bevel portion extends across an entire width of the first box body in a third direction perpendicular to the first direction.

2. The fiber access terminal according to claim 1, wherein the second assembly further comprises a plurality of dustproof caps, each of the plurality of dustproof caps being disposed on one optical fiber adapter of the second assembly.

3. The fiber access terminal according to claim 1, wherein the first assembly further comprises a first fastening component, and the first box body comprises an upper box body and a lower box body; and, wherein
the upper box body and the lower box body are fastened by using the first fastening component.

4. The fiber access terminal according to claim 3, wherein the first fastening component comprises a plurality of screws, and the upper box body and the lower box body are fastened by using the plurality of screws.

5. The fiber access terminal according to claim 4, wherein the fiber access terminal further comprises a second fastening component; and
the first assembly and the second assembly are fastened by using the second fastening component.

6. The fiber access terminal according to claim 5, wherein the second fastening component comprises a plurality of screws; and
the first assembly and the second assembly are fastened by using the plurality of screws.

7. The fiber access terminal according to claim 1, wherein the first assembly comprises one or more optical fiber adapters, wherein a quantity of optical fiber connectors and that of optical splitters are consistent with a quantity of optical fiber adapters of the first assembly, wherein
- a first end of each optical fiber connector is detachably connected to one optical fiber adapter of the first assembly, and a second end of each optical fiber connector is connected to an input port of one optical splitter.

8. The fiber access terminal according to claim 1, wherein the optical fiber adapter of the first assembly and the plurality of optical fiber adapters of the second assembly are outdoor optical fiber adapters.

9. The fiber access terminal according to claim 1, wherein the optical fiber adapter of the first assembly is disposed at a bottom of the first box body; and
- the optical fiber connector is disposed at a top of the second box body, and the plurality of optical fiber adapters of the second assembly are disposed at the bottom of the second box body.

* * * * *